UNITED STATES PATENT OFFICE.

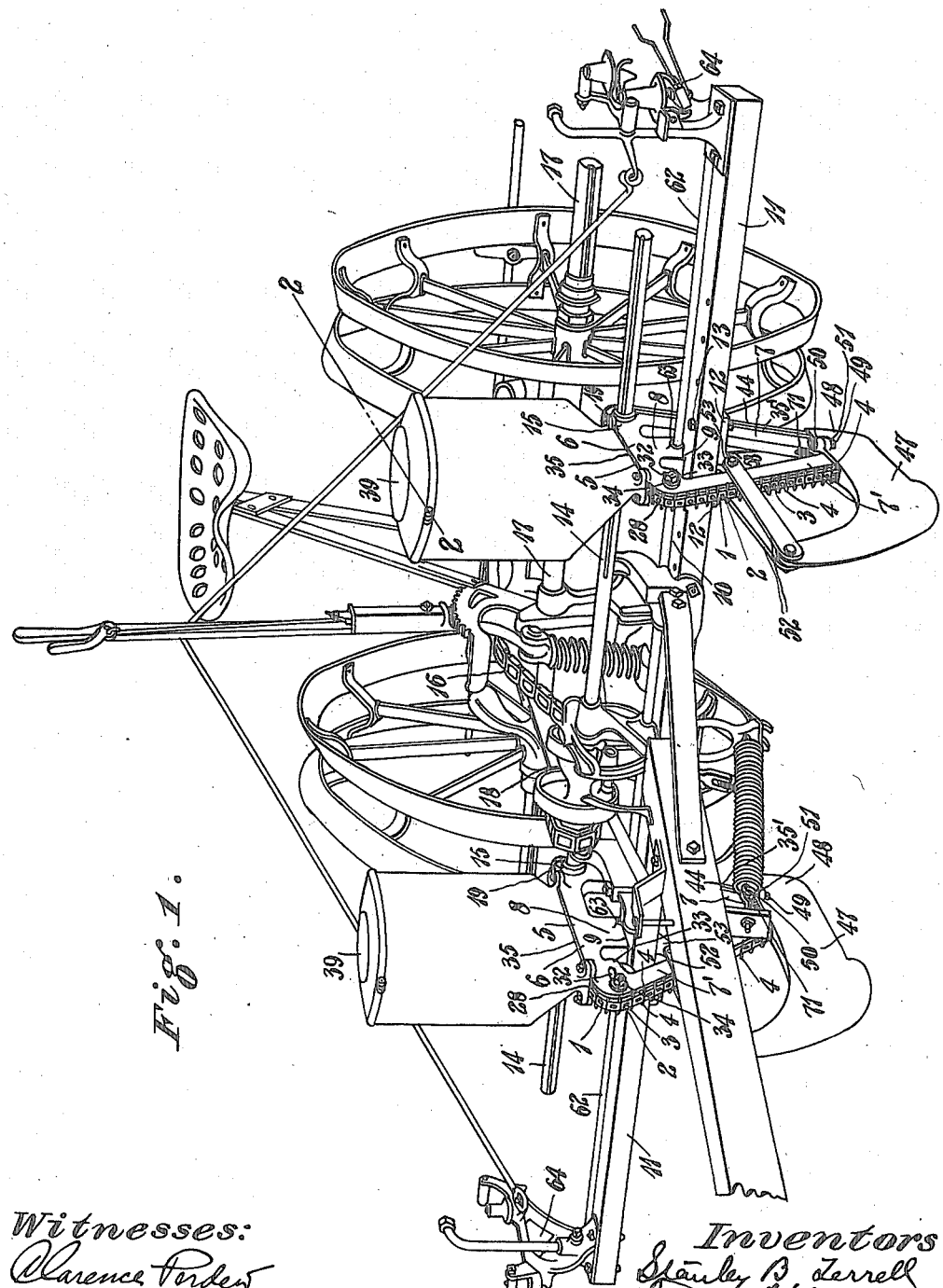

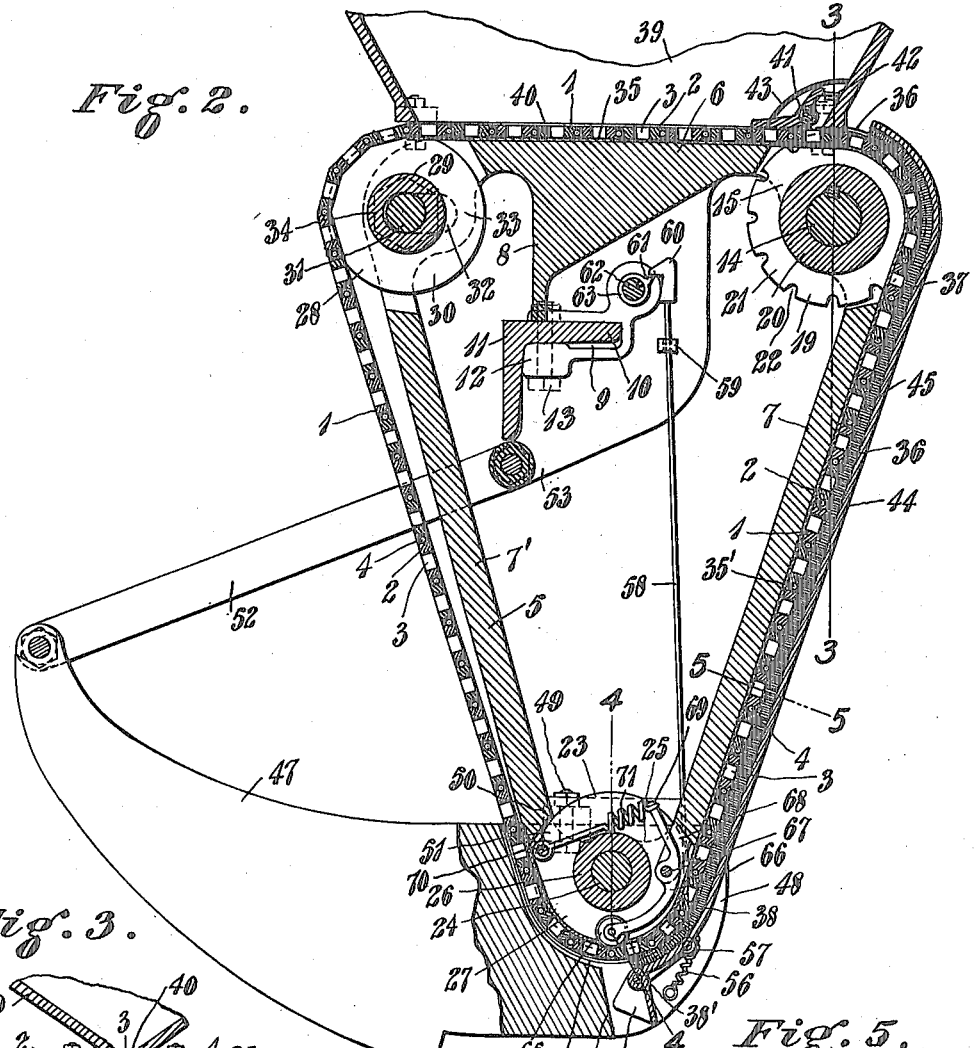

STANLEY B. TERRELL, OF MARTINSVILLE, AND FRANK R. TERRELL, OF LYNCHBURG, OHIO.

PLANTER.

1,264,454.    Specification of Letters Patent.    Patented Apr. 30, 1918.

Application filed July 2, 1917. Serial No. 178,148.

*To all whom it may concern:*

Be it known that we, STANLEY B. TERRELL and FRANK R. TERRELL, citizens of the United States, residing at Martinsville, in the county of Clinton and State of Ohio, and Lynchburg, in the county of Highland and State of Ohio, respectively, have invented certain new and useful Improvements in Planters, of which the following is a specification.

Our invention relates to seeders and planters, and its object is to insure greater accuracy in the spacing of the grains or kernels in the ground, especially in drilling.

Our invention consists in the combination of parts and in the details of construction and arrangement of parts as will hereinafter be more fully described and claimed.

In the drawings:

Figure 1 is a general perspective view of a corn planter equipped with a device embodying our invention;

Fig. 2 is a vertical longitudinal section of the device on a plane corresponding to the line 2—2 of Fig. 1;

Fig. 3 is a vertical cross-section on planes corresponding to the line 3—3 of Fig. 2;

Fig. 4 is a partial vertical cross-section on a plane corresponding to the line 4—4 of Fig. 2; and Fig. 5 is a partial vertical cross-section on a plane corresponding to the line 5—5 of Fig. 2.

The most prominent novel feature of our invention is the provision of a chain with apertured links, so that each link will carry a grain or kernel from the source of supply down close to the ground; thereby positively delivering the grains or kernels down near to the ground, so that instead of dropping eighteen or twenty inches through a chute or throat they only drop about one inch, and are thus more accurately spaced along the rows in drilling.

Thus, as shown in the drawings, the chain 1 is made up of a plurality of links 2 each having a central aperture 3 and each having on its opposite sides near its hinged junction with the next link in one direction laterally projecting lugs 4.

A frame 5 of general triangular formation with the base of the triangle upward forming the top 6 of the frame, and with the downwardly converging sides 7 and 7' considerably longer than the top 6, has, as herein shown, a pedestal 8 projecting down from the middle of the top 6 inside the frame, which pedestal has a forwardly opening transverse slot 9 that receives the rearwardly extending horizontal leg 10 of the beam 11 that extends across the front of the corn planter, as shown in Fig. 1; and this pedestal has lateral projections 12 with bolts 13 extending through them and through the leg 10 to secure the frame to the beam 11.

Near the rear angle of the frame at the top, the shaft 14 extends transversely through bearings 15 forming parts of the frame 5; this shaft 15 being suitably driven by a sprocket 16 from the main axle 17 of the planter. The details of this driving mechanism being well known in planters of the kind illustrated in Fig. 1, more detailed illustration or description is not deemed necessary herein; it being sufficient to understand that when the planter is pulled along the ground, the shaft 15 is rotated at some certain speed relative to that of the axle 17. It will also be understood that such planters are provided with mechanism 18 by means of which this relative speed may be changed.

Between the bearings 15 of the frame 5, the shaft 14 has a driving-wheel 19 which comprises a middle hub 20 and laterally spaced flanges 21 having notches 22 in their peripheries which receive the lugs 4 of the chain 1.

Near the lower angle of the frame where the sides 7 and 7' meet, a wheel 23 is journaled on a transverse shaft 24 mounted in transversely spaced bearings 25 of the frame 5. This wheel 23 is like the wheel 19 in having a hub 26 and laterally spaced flanges 27, but the peripheries of these flanges are not notched. A similar wheel 28 with a hub 29 and flanges 30 with smooth peripheries is journaled on a transverse shaft 31 that is mounted in slots 32 extending horizontally inward in laterally spaced apart bearings 33 near the front angle of the frame where the front side 7' joins the top 6. Nuts 34 on the ends of the shaft 31 serve to fix this shaft in any position along the slot 32. This slot is of such extent and location that the peripheries of the flanges 30 may be extended some distance beyond the outer surface of the front side 7', thereby tightening the chain which is made endless and thus passes around the three wheels 19, 23 and 28. It will be understood that this wheel is made adjustable inward and outward for facilitating the application and removal of the chain 1.

A chain guide of channeled cross-section comprises a part 35 running along the part 6 and a part 35' running down around the wheel 19 and continuing down along the rear side 7 and under the lower wheel 23 and for a short distance upward along the front side 7'. Beginning at the rear end of the hopper, this part 35' has inturned flanges 36 so that the chain is inclosed by this part of the channel except in the middle where its apertures are (Fig. 5.) The channel has slots 37 through which extend the peripheries of the flanges 21 of the wheel 19 (Fig. 3,) and also has slots 38 through which extend the peripheries of the flanges 27 of the wheel 23 (Fig. 4.) The chain guide, of the extent described, greatly facilitates the threading of the chain around the lower wheel 23 in applying the chain to the mechanism.

The can or hopper 39 comprises in its lower part downwardly converging sides which close its bottom except for an elongated slot 40 that is a little wider than the apertures 3 in the chain links 2 and of such length that it is open to the apertures of all those links running in a straight line across the top 6 from the wheel 32 to the driving-wheel 19.

Just inside the rear end of the hopper 39 is a chuck 41 across the path of the chain 1 held down by a spring 42 and making contact with the upper faces of the chain links as they pass thereunder; this chuck being pivotally mounted in a casing 43 and extending forward from the rear side of the hopper 39 through a slot in said casing. This prevents passage of grains out of the hopper except in the chain apertures.

A strip 44, with bristles 45 extending inward against the exposed faces of the chain links between the flanges 36 of the channel 35', extends from near the rear end of the hopper down under the wheel 27. This strip 44 is supported by legs 46 that straddle the rear frame-member 7 and are suitably secured thereto (Fig. 5.)

The runner 47 is of well-known design as found in certain kinds of corn planters and its diverging rear end parts 48 flank the lower end of the frame 5 and the mechanism just described as being mounted thereon (Figs. 2 and 4) being attached to the frame 5 by bolts 49 passing through meeting lugs 50 and 51 on the frame and runner, respectively. The front end of the runner has braces 52 bolted to it and extending back and flanking the chain 1 and front frame-member 7' and bolted to a downward projection 53 on the pedestal 8 of the frame 5; this bracing of the front end of the runner not being original with us.

The diverging rear end parts 48 of the runner 47 thus flanking the mechanism and forming a boot that projects into the ground by virtue of the cutting action of the runner 47, have horizontally pivoted between them a valve-member 54 which may swing downward and forward against a front side 55 of the boot immediately forward of the lowermost position reached by a link aperture 3. This valve 54 is not used except when checking; but when so used is normally drawn downward and forward by a spring 56 acting on a rearwardly upwardly projecting arm 57 of the valve-member 54 and is intermittently drawn backward by a rod 58 pivoted to the arm 57 and extending up into a recess in the pedestal 8 where it is guided in a lug 59 and has on its upper end a dog 60 engaged by a tooth 61 on a shaft 62 that extends transversely through the pedestal 8 with bearings 63 therein. It will be understood that this shaft 62 extends out along the beam 11 to the check-heads 64 whereby these check-heads coöperating with the check-wire act through the medium of the shaft 62 and rod 58 and their associated parts to open the valve 54 at the proper times to drop a required number of grains or kernels which have in the intervening periods been deposited in the closed valve-member 54 from the chain links.

When the machine is to be used for drilling, the check-heads 64 are rendered inoperative and hold the valve-member 54 back, as shown in Fig. 2, so that the grains or kernels may drop one at a time as the apertures 3 successively pass through their lowermost positions around the wheel 23.

In order to insure the dropping of the grains or kernels from the apertures at this point, whether in checking or drilling, we prefer to provide a small roller 65 journaled in the lower end of a curved lever 66 having a fulcrum 67 in a lug 68 that projects forwardly and downwardly from the rear frame-member 7 between the flanges 27 of the wheel 23, through a slot 38 in the channel 35'. This lever 66 has an upper end part 69 between which and the lug 70 projecting down from the front frame-member is stretched a tension-spring 71. Thus, as an aperture 3 passes under this roller 65, the spring 71 through the medium of the lever 66 forces the roller down a short distance into the aperture to positively act on the grain or kernel and force it down out of the aperture should it be so engaged therein as not to drop by the action of gravity.

With my invention thus constructed and the supply of grains or kernels in the hopper or magazine 39, and with the planter drawn forward, the chain is driven around by the driving wheel 19 with its links passing backward under the hopper and with the apertures 3 exposed to the interior of the hopper amply long for each aperture to receive a grain or kernel.

Then the links passing downward along the back of the device, the bristles 45 adjust themselves to the various sized grains or kernels in the apertures 3 while holding the grains or kernels in the apertures until each aperture reaches the lowermost point under the wheel 23, there to drop out or be forced out by the roller 65 and to drop either directly into the ground in drilling or into the closed valve-member 54 in checking. The apertures being empty in their upward passage from the wheel 23 to the wheel 28, no closure either behind or in front of the links is needed, and the chain thus travels a short distance forward from the front side of the front frame-member 7', allowing the freedom of adjustment by moving the wheel 28 in the manner hereinbefore described.

In checking it will be understood that the check-heads coöperating with the check-wires will open the valve 54 at the proper intervals along the ground and the driving means for the shaft 14 will be properly adjusted to leave the desired number of grains or kernels (usually three) in the valve 54 before each such opening. These driving and checking means may be of any suitable kind, such as are well-known in the planter of the kind illustrated in Fig. 1, or in planters of other kinds.

From the foregoing, it will be seen that our invention is adapted to space the kernels of corn or other grain in the row accurately at any desired spacing, thereby distributing the corn or other plant over a field more evenly and insuring a more uniform and greater yield of grain.

This is true not only in drilling, but also in check-row planting our device is more accurate inasmuch as it eliminates all of the superfluous grains and insures the proper number of grains, as two, three or four, as the operator desires to plant in one hill, so that an even stand of corn or other plant is attained.

Not only is there more uniform planting either in drilling or checking, but in either case there is little liability of choking in the lower outlet of the boot by the scraping up of dirt or other objects therewith, because the chain is constantly moving down in this part of the machine and the space below the chain is so short relative to its width that any such volume of obstruction as should gather therein is readily dislodged by this moving chain.

It will be understood that our invention is capable of considerable modification in adapting it to various conditions, and therefore, we do not wish to be understood as being limited to the precise details illustrated and described herein as an example of our invention, but having thus fully exemplified our invention, what we claim as new and desire to secure by Letters Patent is:

1. In a planter, a seed reservoir having an opening in its bottom, a chain having apertured links, means movably supporting said chain so that it may pass under said opening and receive seeds from said opening into the apertures of its links, lower means under which said chain passes down near the ground, seed-retaining means along said chain where it passes down and terminating adjacent to said lower means, whereby said apertures deliver said seeds close to the ground, and means whereby said chain is driven.

2. In a planter, a seed reservoir having an elongated slot in its bottom, a chain having apertured links, means movably supporting said chain so that it may pass along under said slot and receive seeds from said slot into the apertures of its links, lower means under which said chain passes down near the ground, seed-retaining means along said chain where it passes down and terminating adjacent to said lower means, whereby said apertures deliver said seeds close to the ground, and means whereby said chain is driven.

3. In a planter, a seed reservoir having an opening in its bottom, a chain having apertured links, means movably supporting said chain so that it may pass under said opening and receive seeds from said opening into the apertures of its links, lower rotary means under which said chain passes down near the ground, seed-retaining means along said chain where it passes down and terminating below the axis of said rotary means, whereby said apertures deliver said seeds close to the ground, means supporting said rotary means, and means whereby said chain is driven.

4. In a planter, a seed reservoir having an elongated slot in its bottom, a chain having apertured links, means movably supporting said chain so that it may pass along under said slot and receive seeds from said slot into the apertures of its links, lower rotary means under which said chain passes down near the ground, seed-retaining means along said chain where it passes down and terminating below the axis of said rotary means, whereby said apertures deliver said seeds close to the ground, means supporting said rotary means, and means whereby said chain is driven.

5. In a planter, a seed reservoir having an opening in its bottom, a chain having apertured links, wheels near opposite sides of said reservoir, supporting said chain so that it may pass under said opening and receive seeds from said opening into the apertures of its links, a lower wheel, said chain passing down under this lower wheel, seed-retaining means extending along said chain where it passes down, and terminating below the axis of said lower wheel, whereby said apertures deliver said seeds close to the ground, means supporting said wheels for rotation, and means whereby said chain is driven around said wheels.

6. In a planter, a seed reservoir having an elongated slot in its bottom, a chain having apertured links, wheels near opposite ends of said slot, supporting said chain so that it may pass along under said slot and receive seeds from said slot into the apertures of its links, a lower wheel, said chain passing down under this lower wheel, seed-retaining means extending along said chain where it passes down, and terminating below the axis of said lower wheel, whereby said apertures deliver said seeds close to the ground, means supporting said wheels for rotation, and means whereby said chain is driven around said wheels.

7. In a planter, in combination with a seed reservoir having an elongated slot in its bottom, a chain having seed-receiving apertures moving longitudinally under said slot and down from one end of said slot to a point close to the ground, and up from said point to the other end of said slot, and delivering seed near said point close to the ground, means for driving said delivering means, and a roller yieldably mounted to enter said apertures as they pass the point of delivery.

8. In a planter, a frame of general triangular formation with a substantially horizontal upper side and downwardly converging front and rear sides, wheels journaled near the angles of said frame, a chain having apertured links moving around said wheels down one of said frame sides, a seed reservoir having an elongated slot in its bottom over said apertures as said links pass along said upper side, seed-retaining means along said chain where it moves down, said chain delivering seeds from its apertures near the lower angle of said frame, one of said wheels having a notched periphery, and engaging means on said chain to engage in the notches of said periphery, whereby said wheel drives said chain.

9. In a planter, a frame of general triangular formation with a substantially horizontal upper side and downwardly converging front and rear sides, wheels journaled near the angles of said frame, a chain having apertured links moving around said wheels down one of said frame sides, a seed reservoir having an elongated slot in its bottom over said apertures as said links pass along said upper side, seed-retaining means along said chain where it moves down, said chain delivering seeds from its apertures near the lower angle of said frame, one of said wheels having a notched periphery, engaging means on said chain to engage in the notches of said periphery, whereby said wheel drives said chain, and a chain guide of channeled cross-section with inturned flanges across lateral parts of said chain from a point near said reservoir to a point on the side of said frame where said chain moves up.

STANLEY B. TERRELL.
FRANK R. TERRELL.

Witnesses:
CHARLIE HOLLADAY,
G. E. STAUTNER.